United States Patent [19]

Hoppin et al.

[11] Patent Number: 4,990,478

[45] Date of Patent: Feb. 5, 1991

[54] SILANE-MODIFIED SUPPORTED POLYOLEFIN CATALYST TO PRODUCE A BROADENED MOLECULAR WEIGHT DISTRIBUTION PRODUCT

[75] Inventors: Charles R. Hoppin; Benjamin S. Tovrog, both of Naperville, Ill.

[73] Assignee: Amoco Corporation, Chicago, Ill.

[21] Appl. No.: 410,663

[22] Filed: Sep. 21, 1989

[51] Int. Cl.$^5$ ............................................. C08F 4/649
[52] U.S. Cl. .................................. 502/125; 502/121; 502/122; 502/123; 502/124; 502/126; 502/127; 526/125
[58] Field of Search ............... 502/121, 122, 123, 124, 502/125, 126, 127

[56] References Cited

U.S. PATENT DOCUMENTS

| | | | |
|---|---|---|---|
| 4,565,798 | 1/1986 | Yamamoto et al. | 502/125 X |
| 4,619,981 | 10/1986 | Tajima et al. | 502/125 X |
| 4,780,443 | 10/1988 | Matsuura et al. | 502/123 X |
| 4,814,314 | 3/1989 | Masuura et al. | 502/127 X |
| 4,816,433 | 3/1989 | Terano et al. | 502/127 |
| 4,829,038 | 5/1989 | Hoppin et al. | 502/125 |

Primary Examiner—Patrick P. Garvin
Attorney, Agent, or Firm—Wallace L. Oliver; William H. Magidson; Ralph C. Medhurst

[57] ABSTRACT

An olefin polymerization catalyst system comprises a solid, hydrocarbon-insoluble, magnesium-containing, titanium-containing, electron donor-containing component; an alkyl aluminum compound; and organosilane compound selected from the group consisting of branched $C_3$-$C_{10}$ alkyl-t-butoxydimethoxysilanes.

16 Claims, No Drawings

SILANE-MODIFIED SUPPORTED POLYOLEFIN CATALYST TO PRODUCE A BROADENED MOLECULAR WEIGHT DISTRIBUTION PRODUCT

BACKGROUND OF THE INVENTION

This invention relates to olefin polymerization catalysts and particularly relates to specific silane modifier compounds useful in a supported alphaolefin polymerization catalyst system which can produce propylene polymers having a broadened molecular weight distribution.

Use of solid, transition metal-based, olefin polymerization catalyst components is well known in the art including such solid components supported on a metal oxide, halide or other salt such as widely-described magnesium-containing, titanium halide-based catalyst components. Also known is incorporating an electron donor compound into the titanium-containing component. An olefin polymerization system typically comprises a titanium-containing compound, an alkylaluminum compound and an electron donor modifier compound. The electron donor modifier used in combination with the alkyl aluminum compound and solid titanium-containing compound is distinct from the electron donor which may be incorporated within the titanium-containing compound. Many classes of electron donors have been disclosed for possible use as electron donor modifiers used during polymerization.

One class of such electron donor compounds is organosilanes. For example in U.S. Pat. No. 4,540,679, organosilanes, especially aromatic silanes are described. Use of organosilanes as cocatalyst modifiers also is described in Published U.K. Application No. 2,111,066 and U.S. Pat. Nos. 4,442,276, 4,472,524, 4,478,660, and 4,522,930. Other aliphatic and aromatic silanes used in polymerization catalysts are described in U.S. Pat. Nos. 4,420,594, 4,525,555 and 4,565,798.

Although many organosilane modifiers have been described, it is advantageous to tailor a catalyst system to obtain a specific set of properties of a resulting polymer product. For example, in certain applications a product with a broader molecular weight distribution is desirable. Such a product has a lower melt viscosity at high shear rates than a product with a narrower molecular weight distribution. Many polymer fabrication processes which operate with high shear rates, such as injection molding, oriented film, and thermobonded fibers, would benefit with a lower viscosity product by improving throughput rates and reducing energy costs. Products with higher stiffness, as measured by flexural modulus, are important for injection molded, extruded, and film products since the fabricated parts can be downgauged so that less material would be needed to maintain product properties. Also important is maintaining high activity and low atactic levels such as measured by hexane soluble and extractable materials formed during polymerization.

The specific aliphatic silane modifiers of this invention not only are used in supported catalysts to provide high yield and low atactic products, but also produce a polymer with a broader molecular weight distribution than produced using the preferred silane described in U.S. Pat. No. 4,829,038, incorporated by reference herein, having a common inventorship to this application. Comparative data show a silane of this invention produces a better balance of properties—yield, atactic level, and molecular weight distribution—than other silanes having similar substituent groups.

SUMMARY OF THE INVENTION

An olefin polymerization catalyst system comprises a solid, hydrocarbon-insoluble, magnesium-containing, titanium-containing, electron donor-containing component; an alkyl aluminum compound; and organosilane compound selected from the group consisting of branched $C_3$–$C_{10}$ alkyl-t-butoxydimethoxysilanes.

BRIEF DESCRIPTION OF THE INVENTION

The olefin polymerization catalyst system of this invention comprises a supported titanium-containing component, an alkyl aluminum component and a specific class of aliphatic organosilane compounds. Such class of aliphatic organosilane compounds found most useful in this invention is based on branched $C_3$–$C_{10}$ alkyl-t-butoxydimethoxysilanes. Typically, a $C_3$–$C_6$ alkyl-t-butoxydimethoxysilane is used. Included in this group are isobutyl-t-butoxydimethoxysilane, isopropyl-t-butoxydimethoxysilane, s-butyl-t-butoxydimethoxysilane, t-butyl-t-butoxydimethoxysilane, and neopentyl-t-butoxydimethoxysilane. Mixtures of silanes may be used.

The aliphatic silanes most useful in this invention are isobutyl-t-butoxydimethoxysilane and t-butyl-t-butoxydimethoxysilane.

In another representation of this invention, the silanes useful in this invention may be described as:

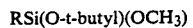

$$RSi(O\text{-}t\text{-butyl})(OCH_3)$$

wherein R is a branched alkyl group containing three to about 10 carbon atoms such as isopropyl, isobutyl, s-butyl, t-butyl, neopentyl, t-pentyl, isopentyl or cyclohexyl. More preferably, R is a branched $C_3$–$C_5$, and most preferably a branched four-carbon, alkyl group.

As used in this invention, the term "branched" alkyl means an alkyl hydrocarbon chain substituted by one or more alkyl groups. Preferably, such chain is substituted by an alkyl group on an alpha($\alpha$) or beta($\beta$) carbon relative to the silicon as represented below wherein $R_1$–$R_5$ are alkyl groups or hydrogen:

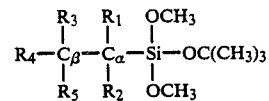

In a preferable silane of this invention, the alpha carbon may be substituted with two hydrogens (primary) or be connected to at least two other carbon atoms (secondary, tertiary). If the alpha carbon has two hydrogens (primary), then the beta carbon preferably should be connected to at least two other carbons (secondary or tertiary). More preferably, if the beta carbon is a methyl, the alpha carbon should be connected to at least one other carbon (secondary or tertiary). As an example, if $R_1$ and $R_2$ are both hydrogens, $R_3$ and $R_4$ should be alkyl groups such as a methyl group, however, if $R_1$ is an alkyl, the substituents $R_3$, $R_4$ or $R_5$ could be hydrogen. In a preferable silane useful in this invention, t-butyl-t-butoxydimethoxysilane, $R_1$ and $R_2$ are both methyls and $R_3$, $R_4$ and $R_5$ are hydrogens.

Typically, polymers using the catalyst system of this invention show broader molecular weight distributions than observed in polymers using a system incorporating a silane such as diisobutyldimethoxysilane (DIBDMSi.). Also, in many instances such polymers show higher flexural modulus values especially when measured by the compression molding technique and many times have less odor.

Titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an organic electron donor compound and a magnesium-containing compound. Optionally, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

One possible magnesium-containing compound, described in U.S. Pat. No. 4,227,370, is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. Pat. No. 4,581,342, assigned to a common assignee, incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium(IV) compound in combination with an organic electron donor compound in a suitable diluent.

Another possible, and preferable, catalyst component is described in U.S. application Ser. No. 186,359, filed Apr. 25, 1988 and now U.S. Pat. No. 4,866,022, corresponding to EP250,230, assigned to a common assignee, which is incorporated by reference herein.

The possible solid catalyst components listed above only are illustrative of many possible solid, magnesium-containing, titanium halide-based, hydrocarbon-insoluble catalyst components useful in this invention and known to the art. This invention is not limited to a specific supported catalyst component.

Titanium(IV) compounds useful in preparing the solid, titanium-containing catalyst component of invention are titanium halides and haloalcoholates having 1 to about 20 carbon atoms per alcoholate group. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds include esters of aromatic acids. Preferred organic electron donors are $C_1$–$C_6$ alkyl esters of aromatic mono- and dicarboxylic acids and halogen-, hydroxyl-, oxo,alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-n-butylphthalate.

The electron donor component used in preparation of the solid catalyst component is used in an amount ranging from about 0.001 to about 1.0 mole per gram atom of titanium, and preferably from about 0.005 to about 0.8 mole per gram atom. Best results are achieved when this ratio ranges from about 0.01 to about 0.6 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferably Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although the chemical structure of the catalyst components described herein is not presently known, the components preferably contain from about 1 to about 6 wt.% titanium, from about 10 to about 25 wt.% magnesium, and from about 45 to about 65 wt.% halogen. Preferred catalyst components made according to this invention contain from about 1.0 to about 3 wt.% titanium, from about 15 to about 21 wt.% magnesium and from about 55 to about 65 wt.% chlorine.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, incorporated herein by reference.

The titanium-containing catalyst component of this invention is used in a polymerization catalyst containing a cocatalyst component including a Group II or III metal alkyl and, preferably, an alkyl aluminum compound together with the organosilane component of this invention.

Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Alkyl aluminum compounds are most preferred. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst composition is formed by combining the supported titanium-containing compound described in this invention and an alkyl aluminum compound together with the electron donor silane modifier of this invention. Typically, useful aluminum-to-titanium atomic ratios in such catalyst formulations are about 10 to about 500 and preferably about 30 to about 300. Preferred aluminum compound-to-silane molar ratios are about 1 to about 40. Typical aluminum-to-silane compound molar ratios are about 3 to about 30.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 30 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.02 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propylbenzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems and are described in U.S. Pat. Nos. 3,957,448; 3,965,083; 3,971,768; 3,970,611; 4,129,701; 4,101,289; 3,652,527; and 4,003,712, all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons.

Also, according to this invention, polymerization can be carried out in the presence of additives to control polymer molecular weights. Hydrogen is typically employed for this purpose in a manner well known to persons of skill in the art. It has been observed that in using the catalyst system of this invention greater amounts of hydrogen were necessary to produce the same melt flow rate (MFR) as compared to a catalyst system using DIBDMSi.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The invention described herein is illustrated, but not limited, by the following Examples and Comparative Runs.

Slurry-Phase Polymerization Performance

Examples I–VIII - Comparative Runs 1–6

A titanium-containing, magnesium-containing, electron donor-containing catalyst component was prepared according to U.S. Ser. No. 055,430 filed May 28, 1987 and now abandoned, assigned to a common assignee and incorporated by reference herein.

The solid titanium-containing catalyst components prepared above were tested in batch hexane-slurry propylene polymerizations. A two-liter Parr reactor was charged with 650 milliliters of hexane, 150 psig of propylene, and 130 milliliters of hydrogen gas. About 20 milligrams of titanium-containing catalyst component together with a triethylaluminum (TEA)-based cocatalyst system including an organosilane cocatalyst modifier were used in the polymerization test run for two hours at 71° C. Specifically, a two-liter Parr reactor was charged with 650 milliliters of hexane and the temperature was raised to about 43° C. The catalyst system was formed from a mixture of 1.0 milliliter of 1.56 molar TEA in hexane, 1.6 milliliters of 0.1 molar organosilane in hexane and 5 milliliters of additional hexane, into which the solid component was rinsed with about 5 milliliters of hexane. The resulting mixture was flushed into the reactor with about 50 milliliters of hexane. Following catalyst addition, hydrogen was added, in the amounts shown in Table I, the reactor temperature was raised to 71° C. and the reactor was pressurized to 150 psig with propylene. Polymerization continued at this temperature and pressure for two hours. Results of the slurry-phase polymerization are shown in Table I with molecular weight distribution data relating to polymers made are shown in Table II. "Yield" (grams of polymer produced per gram of solid catalyst component) was determined by magnesium analysis of the polymer product. "Extractables" were determined by measuring the loss in weight of a dry sample of ground polymer after being extracted in boiling n-hexane for four to six hours. Hexane "Solubles" were determined by evaporation of the filtrate to dryness and weighing the residue. "Atactic" is the amount of Solubles plus Extractables. Polymer molecular weight distributions were determined using standard gel permeation chromatography. The molecular weight distribution parameters $M_n$, $M_w$, $M_z$, $M_{z+1}$ are commonly used and are described in detail in "Textbook of Polymer Science," third edition, F. W. Billmeyer, Jr., John Wiley & Sons, New York, 1984.

TABLE I

Slurry-Phase Polymerization Performance

| Ex. (Run) | Silane | No. of Runs | Al/Si | $H_2$ (mmol) | Yield (Kg/g (cat)) | Solubles (wt. %) | Extractables (wt. %) | Atactic (wt. %) |
|---|---|---|---|---|---|---|---|---|
| I | A | 2 | 7 | 7 | 13.9 | 0.7 | 0.9 | 1.6 |
| II | A | 8 | 10 | 7 | 13.1 | 0.8 | 1.2 | 2.0 |
| III | A | 1 | 10 | 14 | 14.8 | 0.8 | 2.2 | 3.0 |
| IV | A | 2 | 20 | 7 | 15.0 | 1.5 | 2.0 | 3.5 |
| V | B | 4 | 10 | 14 | 17.6 | 0.7 | 1.8 | 2.5 |
| VI | C | 2 | 10 | 35 | 24.8 | 0.9 | 2.3 | 3.2 |
| VII | D | 2 | 10 | 11 | 15.7 | 0.9 | 2.1 | 3.0 |
| VIII | K | 2 | 10 | 11 | 16.7 | 0.8 | 2.2 | 3.0 |
| (1) | E | 5 | 10 | 7 | 12.7 | 1.6 | 2.7 | 3.7 |
| (2) | F | 1 | 10 | 7 | 9.5 | 2.7 | 4.1 | 6.8 |
| (3) | G | 1 | 10 | 7 | 9.7 | 3.7 | 3.3 | 7.0 |
| (4) | H | 1 | 10 | 7 | 12.7 | 1.9 | 2.8 | 4.7 |
| (5) | J | 2 | 10 | 11 | 15.1 | 1.1 | 3.0 | 4.1 |
| (6) | L | 4 | 10 | 7 | 14.5 | 1.0 | 1.4 | 2.4 |

Silanes:
A = (iBu)(tBuO)Si(OCH$_3$)$_2$ Isobutyl-t-butoxydimethoxysilane
B = (iPr)(tBuO)Si(OCH$_3$)$_2$ Isopropyl-t-butoxydimethoxysilane
C = (tBu)(tBuO)Si(OCH$_3$)$_2$ t-Butyl-t-butoxydimethoxysilane
D = (cyclohexyl)(tBuO)Si(OCH$_3$)$_2$ Cyclohexyltbutoxydimethoxysilane
E = (iBu)(iPrO)Si(OCH$_3$)$_2$ Isobutylisopropoxydimethoxysilane
F = (tBuO)$_2$Si(OCH$_3$)$_2$ Di-t-butoxydimethoxysilane
G = (iPrO)$_2$Si(OCH$_3$)$_2$ Diisopropoxydimethoxysilane
H = (iBu)$_2$(iPrO)Si(OCH$_3$) Diisobutylisopropoxymethoxysilane
J = (neo-pentyl)$_2$Si(OCH$_3$)$_2$ Dineopentyldimethoxysilane
K = (neo-pentyl)(tBuO)Si(OCH$_3$)$_2$ Neopentyl-t-butoxydimethoxysilane
L = (iBu)$_2$Si(OCH$_3$)$_2$ Diisobutyldimethoxysilane

TABLE II

Molecular Weight Distributions

| Ex. (Run) | Silane | MFR (g/10 min) | $M_n$ | $M_w$ | $M_z$ | $M_{z+1}$ | $M_w/M_n$ | $M_z/M_w$ |
|---|---|---|---|---|---|---|---|---|
| II | A | 2.1 | 73.6 | 462 | 1606 | 3323 | 6.2 | 3.5 |
| V | B | 3.2 | 65.6 | 390 | 1207 | 2292 | 5.9 | 3.1 |
| VI | C | 2.6 | 59.0 | 441 | 1561 | 3002 | 7.5 | 3.5 |
| VII | D | 3.3 | 64.1 | 414 | 1488 | 3001 | 6.4 | 3.6 |
| VIII | K | 1.6 | 73.3 | 560 | 2227 | 4516 | 7.6 | 4.0 |
| (1) | E | 5.7 | 62.3 | 341 | 1226 | 2744 | 5.4 | 3.6 |
| (2) | F | 9.4 | 47.6 | 327 | 1476 | 3341 | 6.9 | 4.5 |
| (3) | G | 15.5 | 50.8 | 258 | 1045 | 2474 | 5.1 | 4.1 |
| (4) | H | 5.8 | 56.6 | 353 | 1458 | 3423 | 6.2 | 4.1 |
| (5) | J | 3.5 | 60.8 | 434 | 1816 | 3822 | 7.1 | 4.2 |
| (6) | L | 3.8 | 70.3 | 374 | 1260 | 2726 | 5.3 | 3.4 |

Molecular Weight × 10$^{-3}$

Gas-Phase Unit I Polymerization Performance

Examples IX–XI, Comparative Run 7

A series of propylene polymerization runs was performed in a horizontal cylindrical reactor measuring 16 inches in diameter and 48 inches in length (Unit I) that is based on that described in U.S. Pat. No. 3,965,083. The reactor was equipped with an off-gas port for recycling reactor gas through a condenser and back through a recycle line to the recycle nozzles in the reactor. Propylene liquid was used as the quench liquid to help remove the heat generated in the reactor during the polymerization. During operation, polypropylene powder produced in the reactor bed, passed over a weir, and was discharged through a powder discharge system into a secondary closed vessel blanketed with nitrogen. The polymer bed was agitated by paddles attached to a longitudinal shaft within the reactor that was rotated at 50 rpm. The reactor temperature and pressure were maintained at 160° F. (71° C.) and 300 psig respectively. Hydrogen content was maintained at the levels indicated in Table III. The polymer production rate was kept at about 50–55 lb/hr. The titanium-containing catalyst was introduced into the reactor as a 1.25 wt % slurry in hexane through a liquid propylene-flushed catalyst addition nozzle. A mixture of the silane modifier and 20% triethylaluminum in hexane at the Al/Si molar ratios indicated in Table III were fed separately to the reactor through a liquid propylene-flushed co-catalyst addition nozzle.

The polymer flexural modulus was determined by standard techniques known in the industry except that the test bars were molded using a compression molding device.

The results from the Unit I gas-phase reactor are shown in Tables III and IV.

TABLE III

Gas-Phase Unit I Polymerization Performance

| Ex. (Run) | Silane | $H_2/C_3^=$ (×10$^3$) | Al/Si | Yield (Kg/g (cat)) | MFR (g/10 min.) | Extractables (wt. %) | FlexMod[1] (psi ×10$^{-3}$) |
|---|---|---|---|---|---|---|---|
| IX | A | 6.4 | 6 | 17.5 | 2.1 | 0.7 | 282 |
| X | A | 9.6 | 6 | 20.0 | 3.4 | 0.9 | 291 |
| XI | A | 15.5 | 6 | 20.1 | 5.9 | 1.0 | 294 |

TABLE III-continued

| | | Gas-Phase Unit I Polymerization Performance | | | | | FlexMod[1] |
|---|---|---|---|---|---|---|---|
| Ex. (Run) | Silane | $H_2/C_3^=$ ($\times 10^3$) | Al/Si | Yield (Kg/g (cat)) | MFR (g/10 min.) | Extractables (wt. %) | (psi $\times 10^{-3}$) |
| (7) | L | 5.7 | 6 | 19.8 | 3.2 | 1.0 | 249 |

[1]Flexural Modulus measured by compression molding technique.

TABLE IV

| | | Molecular Weight Distribution (Gas-Phase Unit I) | | | | | |
|---|---|---|---|---|---|---|---|
| Ex. (Run) | Silane | Molecular Weight $\times 10^{-3}$ | | | | $M_w/M_n$ | $M_z/M_w$ |
| | | $M_n$ | $M_w$ | $M_z$ | $M_{z+1}$ | | |
| IX | A | 78.1 | 431 | 1330 | 2742 | 5.5 | 3.1 |
| X | A | 64.9 | 355 | 1075 | 2173 | 5.4 | 3.0 |
| XI | A | 59.1 | 321 | 990 | 2054 | 5.4 | 3.1 |
| (7) | L | 70.1 | 356 | 1102 | 2352 | 5.0 | 3.1 |

Gas-Phase Unit II Polymerization Performance

Examples XII–XV, Comparative Run 8

A series of propylene polymerization runs were performed in a small one-gallon continuous gas-phase reactor measuring four inches in diameter and twelve inches in length (Unit II) that was similar in design to the larger Unit I reactor described above. Catalyst solid was fed as a 1.5 wt % slurry in hexane using a liquid propylene flush and the co-catalyst consisting of triethylaluminum and the silane modifier in hexane at the Al/Si molar ratios shown in Table V were added to the reactor through a separate propylene-flushed line. Production rate was about 0.5 lb/hr and the temperature and pressure maintained at 160° F. (71° C.) and 300 psig respectively. Hydrogen was fed to the reactor in order to maintain a powder melt flow rate of between 3–5 grams/10 minutes.

Results from the polymerizations in the Unit II gas-phase reactor are shown in Tables V and VI.

TABLE V

| | Gas-Phase Unit II Polymerization Performance | | | | |
|---|---|---|---|---|---|
| Example | Silane | Al/Si | Yield (kg/g cat) | Extractables (wt %) | Flexural Modulus ($\times 10^{-3}$ psi) |
| XII | A | 6 | 20.6 | 1.1 | 268 |
| XIII | A | 12 | 25.1 | 1.4 | 268 |
| XIV | A | 20 | 23.4 | 1.7 | 277 |
| XV | C | 6 | 24.8 | 1.7 | — |
| (8) | L | 6 | 21.9 | 0.8 | 258 |

TABLE VI

| | | Molecular Weight Distribution (Gas-Phase Unit II) | | | | | |
|---|---|---|---|---|---|---|---|
| Example | Silane | Molecular Weight $\times 10^{-3}$ | | | | $M_w/M_n$ | $M_z/M_w$ |
| | | $M_n$ | $M_w$ | $M_z$ | $M_{z+1}$ | | |
| XII | A | 65.3 | 337 | 995 | 1928 | 5.2 | 3.0 |
| XIII | A | 67.6 | 367 | 1178 | 2523 | 5.4 | 3.2 |
| XIV | A | 62.7 | 342 | 1079 | 2209 | 5.4 | 3.2 |
| XV | C | 56.9 | 333 | 1059 | 2207 | 5.8 | 3.2 |
| (8) | L | 74.1 | 362 | 1069 | 2159 | 4.9 | 3.0 |

The data show that examples of this invention generally have a broader molecular weight distribution than analogous comparative runs while maintaining acceptable catalyst activity and stereospecificity. Also, an increase in polymer stiffness as measured by flexural modulus is observed, especially using isobutyl-t-butoxydimethoxysilane as a modifier.

What is claimed is:

1. In an olefin polymerization catalyst system comprising a solid, hydrocarbon-insoluble, supported titanium, magnesium halide component containing an electron donor; an alkyl aluminum compound; and an organosilane compound, the improvement comprising selecting the organosilane compound from the group consisting of branched $C_3$–$C_{10}$ alkyl-t-butoxydimethoxysilanes.

2. The catalyst system of claim 1 wherein the organosilane compound is a branched $C_3$–$C_5$ alkyl-t-butoxydimethoxysilane.

3. The catalyst system of claim 1 wherein the organosilane compound is isobutyl-t-butoxydimethoxysilane.

4. The catalyst system of claim 1 wherein the organosilane compound is t-butyl-t-butoxydimethoxysilane.

5. The catalyst system of claim 1 wherein the organosilane compound is isopropyl-t-butoxydimethoxysilane.

6. The catalyst system of claim 1 wherein the organosilane compound is cyclohexyl-t-butoxydimethoxysilane.

7. The catalyst system of claim 1 wherein the organosilane compound is neopentyl-t-butoxydimethoxysilane.

8. In an olefin polymerization catalyst system comprising a solid, hydrocarbon-insoluble, supported titanium, magnesium halide component containing an electron donor; triethylaluminum; and an organosilane compound, the improvement comprising selecting the organosilane compound from the group consisting of branched $C_3$–$C_{10}$ alkyl-t-butoxydimethoxysilanes.

9. The catalyst system of claim 8 wherein the organosilane compound is isobutyl-t-butoxydimethoxysilane.

10. The catalyst system of claim 8 wherein the organosilane compound is t-butyl-t-butoxydimethoxysilane.

11. The catalyst system of claim 8 wherein the organosilane compound is isopropyl-t-butoxydimethoxysilane.

12. The catalyst system of claim 8 wherein the organosilane compound is cyclohexyl-t-butoxydimethoxysilane.

13. The catalyst system of claim 8 wherein the organosilane compound is neopentyl-t-butoxydimethoxysilane.

14. In an olefin polymerization catalyst system comprising a solid, hydrocarbon-insoluble, supported titanium, magnesium halide component containing an electron donor; an alkyl aluminum compound; and organosilane compound, the improvement comprising selecting the organosilane compound having a structure:

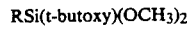

$RSi(t-butoxy)(OCH_3)_2$ wherein R is isobutyl-, isopropyl-, or t-butyl- groups.

15. The catalyst system of claim 14 wherein the alkyl aluminum compound is triethylaluminum.

16. The catalyst system of claim 15 wherein the organosilane compound is isobutyl-t-butoxydimethoxysilane or t-butyl-t-butoxydimethoxysilane.

* * * * *